(12) United States Patent
Optiz et al.

(10) Patent No.: US 7,775,124 B2
(45) Date of Patent: Aug. 17, 2010

(54) ULTRASONIC SENSOR WITH RECIPROCAL TRANSMITTING AND RECEIVING CIRCUIT

(75) Inventors: Bernhard Optiz, Leonberg (DE); Michael Horstbrink, Stuttgart-Feuerbach (DE); Tobias Lang, Stuttgart (DE); Johannes Artzner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 12/031,925

(22) Filed: Feb. 15, 2008

(65) Prior Publication Data

US 2009/0000394 A1   Jan. 1, 2009

(30) Foreign Application Priority Data

Jun. 28, 2007   (DE) .................. 10 2007 029 957

(51) Int. Cl.
G01F 1/66 (2006.01)
(52) U.S. Cl. ................................. 73/861.27
(58) Field of Classification Search .............. None
See application file for complete search history.

(56) References Cited

U.S. PATENT DOCUMENTS

| | | | | |
|---|---|---|---|---|
| 3,623,363 A * | 11/1971 | Dory | .................. | 73/861.29 |
| 3,720,105 A * | 3/1973 | Cirulis | ................. | 73/861.28 |
| 4,202,210 A * | 5/1980 | Multon et al. | ........... | 73/861.26 |
| 4,221,128 A * | 9/1980 | Lawson et al. | .......... | 73/861.29 |
| 4,424,715 A * | 1/1984 | Hansen | ................... | 73/861.28 |
| 4,442,719 A * | 4/1984 | Allen et al. | .............. | 73/861.29 |
| 4,509,372 A * | 4/1985 | Mount | ..................... | 73/861.28 |
| 4,633,719 A * | 1/1987 | Vander Heyden | ........ | 73/861.28 |
| 4,663,977 A * | 5/1987 | Vander Heyden | ........ | 73/861.27 |
| 4,785,664 A * | 11/1988 | Reebs | ...................... | 73/290 V |
| 4,897,610 A * | 1/1990 | Van Zeijl | ................... | 330/84 |
| 6,003,385 A * | 12/1999 | De Vanssay et al. | ...... | 73/861.25 |
| 6,397,044 B1 * | 5/2002 | Nash et al. | .................. | 455/73 |
| 6,947,851 B2 * | 9/2005 | Jespersen | .................... | 702/45 |
| 7,437,948 B2 * | 10/2008 | Kishiro et al. | .......... | 73/861.27 |

FOREIGN PATENT DOCUMENTS

EP   1469183   * 10/2004

* cited by examiner

*Primary Examiner*—Harshad Patel
(74) *Attorney, Agent, or Firm*—Michael J. Striker

(57) ABSTRACT

An ultrasonic sensor has at least two ultrasonic converters for transmitting and receiving ultrasonic signals, connected with a transmitting circuit and a receiving circuit. A switching device is provided, by which the ultrasonic converters are connected in series when in the transmission mode, and they are separated from each other when in the receiving mode.

15 Claims, 6 Drawing Sheets

ULTRASONIC SENSOR WITH RECIPROCAL TRANSMITTING AND RECEIVING CIRCUIT

CROSS-REFERENCE TO A RELATED APPLICATION

The invention described and claimed hereinbelow is also described in German Patent Application DE 102007029957.7 filed on Jun. 28, 2007. This German Patent Application, whose subject matter is incorporated here by reference, provides the basis for a claim of priority of invention under 35 U.S.C. 119(a)-(d).

BACKGROUND OF THE INVENTION

The present invention relates to an ultrasonic sensor with at least two ultrasonic converters.

Ultrasonic flow sensors are used, in particular, to measure the volume flow, mass flow, or the flow rate of a gaseous or liquid medium that flows through a pipeline. A known type of ultrasonic flow sensor includes two ultrasonic converters located such that they are offset in the direction of flow, each of which generates ultrasonic signals and transmits them to the other ultrasonic converter. The ultrasonic signals are received by the other converter and are evaluated electronically. The difference between the transit time of the signal in the direction of flow and the transit time of the signal in the opposite direction is a measure of the flow velocity of the fluid.

FIG. 1 shows a typical design of an ultrasonic flow sensor 6 with two ultrasonic converters A, B, which are located inside a pipeline 3 and are diametrically opposed at a distance L from each other. A fluid 1 flows in pipeline 3 with a velocity v in the direction of arrow 2. Measurement path L is tilted relative to flow direction 2 at an angle α. While a measurement is being carried out, ultrasonic converters A, B send ultrasonic pulses to each other. The signals are decelerated or accelerated, depending on the direction of the flow. The transit times of the ultrasonic signals are a measure of the flow rate to be determined.

FIG. 2 shows a greatly simplified schematic depiction of associated transmitting and receiving circuit 4. The two ultrasonic converters A, B are activated by an oscillator with a burst having a specified clock frequency 8 (e.g., a square-wave signal). Ultrasonic signals 7 generated as a result (only the envelopes of the signals are shown here) travel along measurement path L and are detected by the other ultrasonic converter A, B. Transit time $t_{12}$ or $t_{21}$ of signals 7 is measured.

When the medium is at rest, the differential transit time should be equal to zero. In reality, deviations always occur, however, which are based in particular on tolerances of the two ultrasonic converters A, B. As a result, even when medium 1 is at rest, a differential transmit time not equal to zero is measured (a "zero flow error"). Due to temperature and aging influences, this offset may change over the course of time, thereby resulting in measurement errors.

SUMMARY OF THE INVENTION

The object of the present invention, therefore, is to create a transmitting and receiving circuit for ultrasonic sensors that makes it possible to perform measurements in the most consistent and precise manner possible.

An essential aspect of the present invention is that a switching device is provided, by way of which the ultrasonic converters are switchable between a transmission mode and a receiving mode. In the transmission mode, at least one of the converters is activated, and it generates an ultrasonic signal that is transmitted to the other converter. The converters are then operated in the receiving mode and they are decoupled from each other using the switching device, so that they may be evaluated separately.

According to a first embodiment of the present invention, the switching device includes two antiparallel-connected diodes. In this case, the converters are connected at one of their connections with the transmitting circuit, and they are connected at the other connection with the diode arrangement. The diodes are conductive in the transmission mode. The converters are therefore activated simultaneously with the same current and therefore generate identical ultrasonic signals, provided they are identical in design. The diodes block current flow in the receiving mode, however, since the signal generated by the converters is smaller—by several orders of magnitude—than it is in the transmission mode, and it does not exceed the threshold voltage of the diodes. In the receiving mode, the converter signals may therefore be evaluated independently of each other.

According to a second embodiment of the present invention, the switching device includes switches, in particular transistors, which are located parallel with the ultrasonic converters. In this case, the converters are also connected via a connector with the transmitting circuit. At the other connector, they are preferably connected with each other directly, i.e., without any further switching elements (diodes, transistors, etc.).

In the transmission mode, a switch is preferably closed; the associated converter (e.g., A) is therefore short-circuited. The other switch is opened, thereby enabling the associated converter (e.g., B) to operate in the transmission mode and transmit ultrasonic signals. The switching position of the switches is reversed in the receiving mode. The previously-transmitting converter (B) is then short-circuited, and the other converter (A) receives the ultrasonic signal sent by the converter (B). The signals that are received are processed further and evaluated by a receiving circuit.

The switching device is preferably designed fully electronically, e.g., using transistors or diodes, and includes no moving parts, e.g., a relay.

According to a preferred embodiment of the present invention, a circuit (transmitting circuit) is provided to activate the converter. The circuit includes a transformer, and the ultrasonic converters are connected (directly or indirectly) to the secondary winding of the transformer. The converters may be connected via a part winding of the secondary winding with a reference potential that is applied to a center node of the secondary winding. The center node is preferably connected to ground.

According to the present invention, a receiving circuit is provided to evaluate the ultrasonic signals that are received. In the receiving circuit, an amplifier is assigned to each ultrasonic converter. The receiving circuit is designed according to the principles of a reciprocal connection, which only includes linear, passive components. The receiving circuit is also symmetrical in design for both ultrasonic converters. The amplifiers preferably have a very high-resistance input, and they are connected in such a manner as to attain a very high input impedance. When the input impedance of the amplifiers is higher than the damping resistance of the ultrasonic converters by several orders of magnitude, the effect on the current flowing through the ultrasonic converters in the receiving mode is minimized. As a result, the accuracy of the measurement may be increased substantially. In addition, with this design, the impedance of the secondary winding via which the circuit is closed becomes very small relative to the amplifier input impedance.

The ultrasonic converters are preferably connected to a connector with the secondary winding of the transformer and with the receiving circuit via a connector, or with both connectors, when differential evaluation is carried out.

The primary winding of the transformer of the transmission circuit preferably includes at least two part windings, to each of which a switch is connected, the switches being connected with a reference potential. The part windings may therefore be selectively switched against a reference potential. A voltage source is preferably connected with a center node of the primary winding.

The switches are preferably operated such that they switch on and off in an alternating manner. Control electronics are provided to control the switches. The control electronics may be composed of logic gates. The control electronics are preferably designed such that the conducting switch is always switched off first, then the non-conducting switch is switched on. In order to realize this using a single clock pulse, which is used for both switches, the control circuit preferably includes a time-delay element, which, e.g., delays the leading edge for the switch to be switched on, relative to the falling edge of the switch to be switched off. An RC element is preferably provided as the time-delay element.

According to a first embodiment, the operational amplifiers of the receiving circuit are realized as negative-feedback operational amplifiers. The operational amplifiers preferably include a non-linear element in the feedback path. It may therefore be ensured that the input impedance is independent of amplitude.

The non-linearity located in the feedback path may include, e.g., two antiparallel-connected diodes, which are switched between the output and the (inverting) input of the operational amplifier.

According to a second embodiment, the receiving circuit includes an instrument amplifier for each of the ultrasonic converters. The signal voltages of the ultrasonic converters may therefore be evaluated in a differential manner, i.e., the voltage signals are measured and amplified directly at the ultrasonic converter.

Differential signal evaluation is not preferred over non-differential evaluation. A protective resistor is preferably provided at each of the non-inverting inputs (+) of the amplifiers. For reasons of symmetry, an identical resistor is preferably also connected at the other amplifier input (−).

According to a third embodiment, the receiving circuit includes a fully differential amplifier for each of the ultrasonic converters. Each fully differential amplifier is preferably supplemented with at least two switches, with which the inputs (+,−) of the amplifier are switched—in the transmission mode—to connection with a reference potential (ground). The amplifier is therefore not loaded with the high input current when in the transmission mode.

The receiving circuit is preferably integrated in an IC (ASIC). The integrated components are, in particular, the amplifiers and, optionally, the switch located at the input. The external connection of the amplifiers and the components of the transmission circuit are preferably realized as discrete components.

The invention is explained in greater detail below with reference to the attached drawing.

DESCRIPTION OF THE PREFERRED EMBODIMENTS

Figure 1:
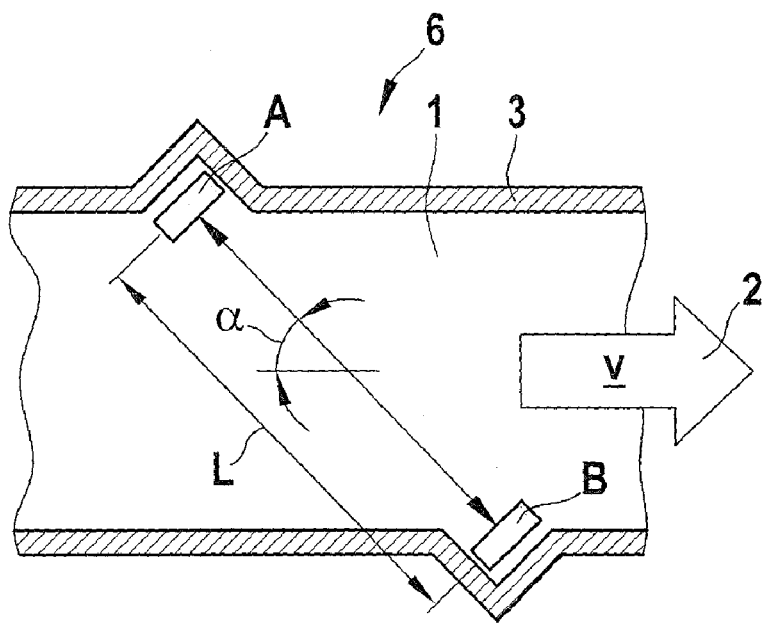
FIG. 1 is a schematic depiction of an ultrasonic sensor with two ultrasonic converters, which are offset relative to each other.
Figure 2:
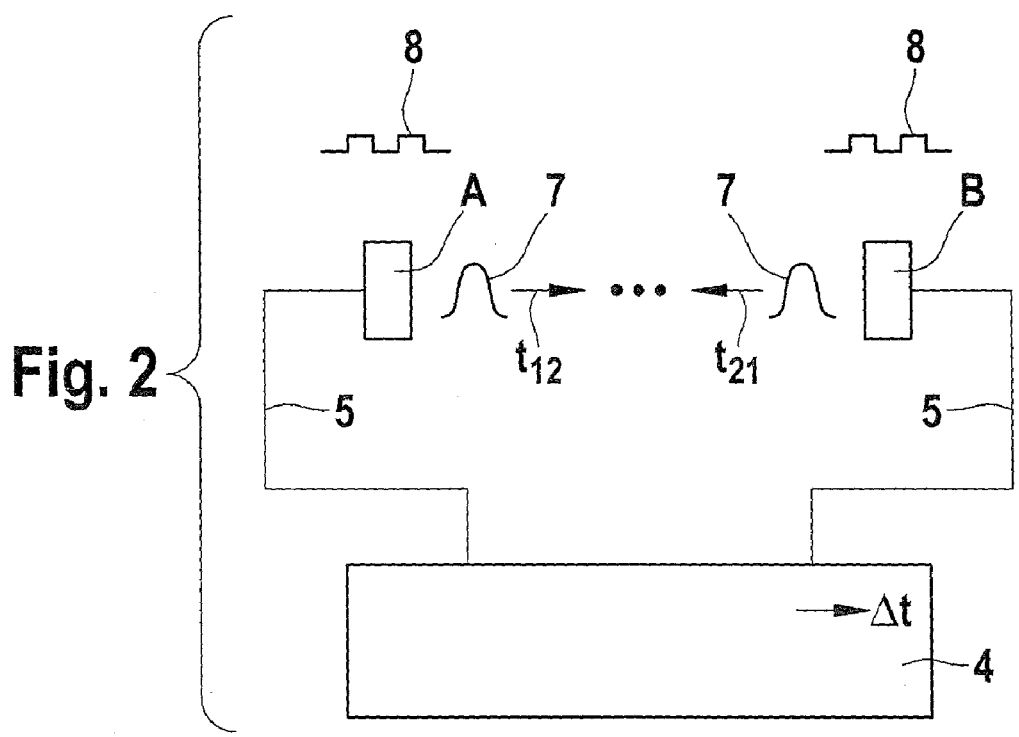
FIG. 2 shows the ultrasonic sensor in FIG. 1 with the associated transmitting and receiving circuit.

FIGS. 1 and 2 are explained in the introduction to the description.

Figure 3:
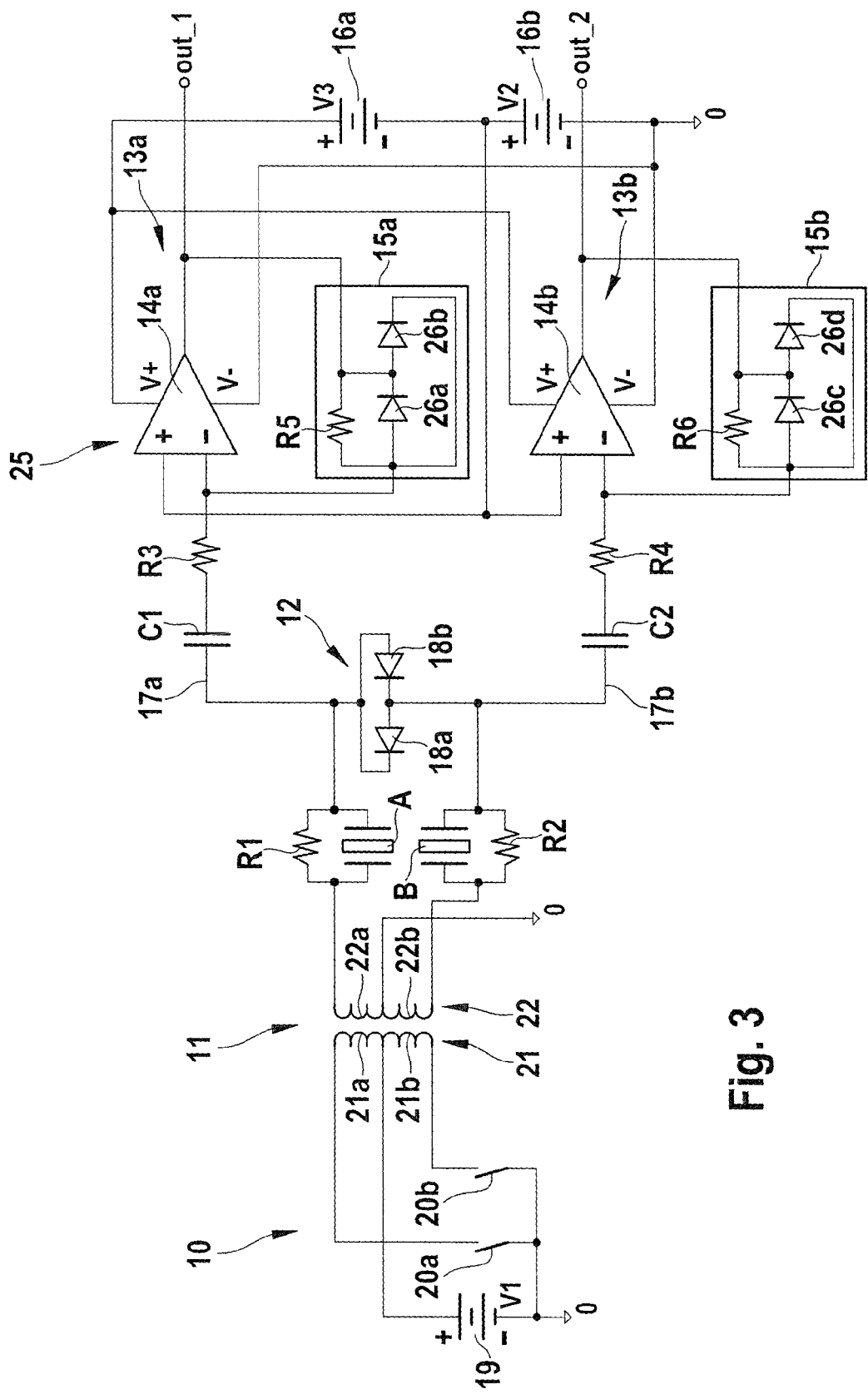
FIG. 3 shows a transmitting and receiving circuit according to a first embodiment of the present invention.

FIG. 3 shows a first embodiment of a transmitting and receiving circuit with negative-feedback operational amplifiers 13a, 13b. Transmission circuit 10 produces a high-frequency signal in an ultrasonic frequency, with which the two ultrasonic converters A, B are activated in the transmission mode. In the example shown, transmission circuit 10 includes a transformer 11 with a primary winding 21 and a secondary winding 22. Primary winding 21 includes two part windings 21a, 21b, to each of which a switch 20a, 20b is connected, and which is switched to a connection with a reference potential (ground). A voltage source 19 is connected at a center node of primary winding 21.

Figure 5:
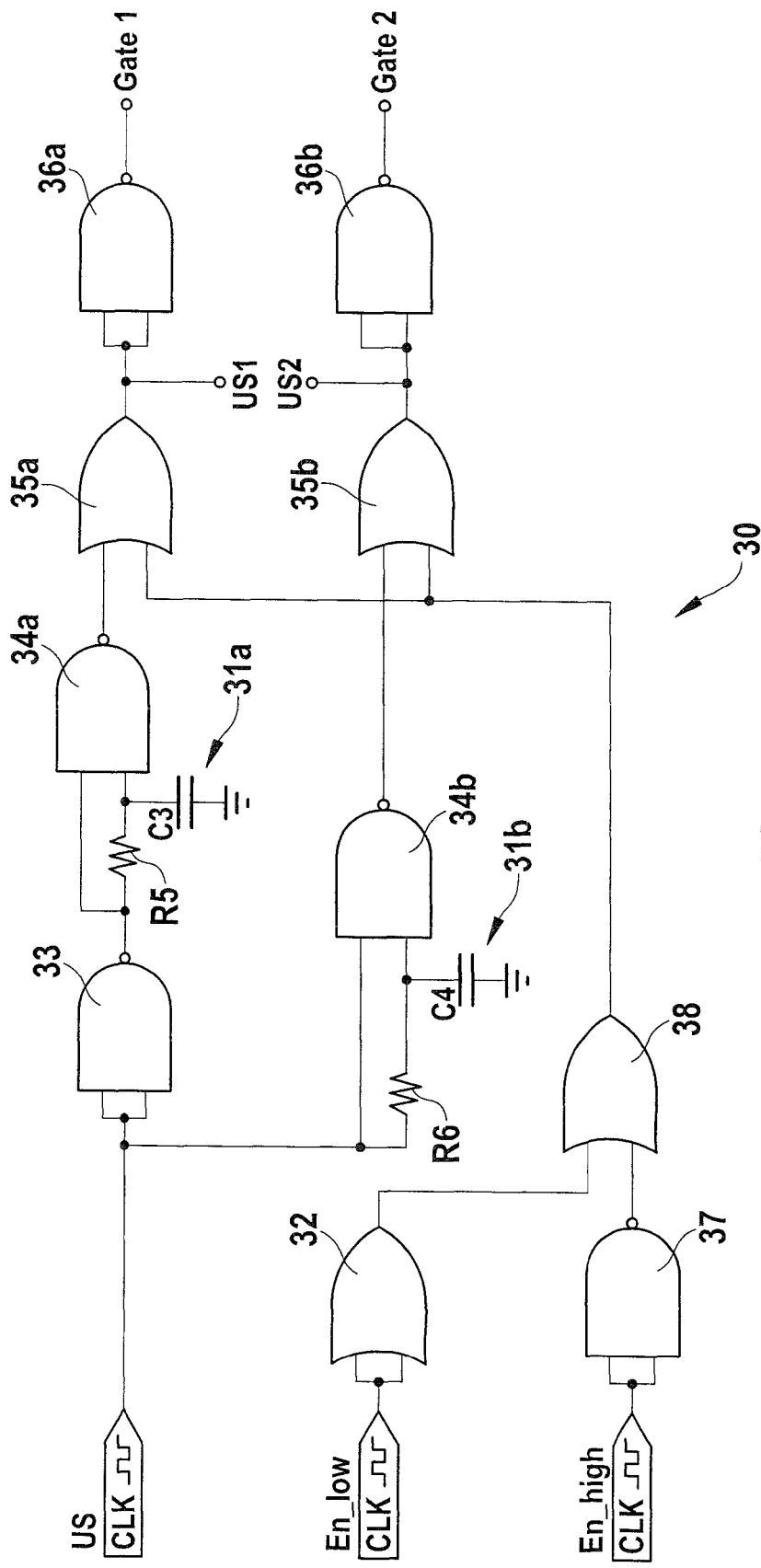
FIG. 5 shows a control circuit for driving the transmitting circuit.

Switches 20a, 20b, which may be realized, e.g., as MOS transistors, are switched on and off during transmission in an alternating manner by a control circuit, which is shown in greater detail in FIG. 5.

For a high-power transmission signal, switches or transistors 20a, 20b must allow high let-through currents and have a high reverse voltage, which is at least twice as high as supply voltage $V_1$. The reason for this is the magnetic coupling of part windings 21a and 21b, to each of which the same voltage is applied. When switch 20b is closed, for example, switch 20a must block double the voltage $V_1$. Due to these high requirements, switching transistors 20a, 20b are preferably realized as discrete components.

In this case, secondary winding 22 of transformer 11 includes two part windings 22a, 22b, to each of which one of the ultrasonic converters A, B is connected. Center connection 24 of secondary winding 22 is connected to ground. A resistor $R_1$ or $R_2$ is shown located parallel in with ultrasonic converters A, B. Resistor $R_1$ or $R_2$ is the damping resistor of converters A, B. In this case, converters A, B are located such that they are connected in series when in the transmission mode. In the transmission mode, current therefore flows, e.g., through upper converter A, a switching device 12, second converter B, and through secondary winding 22. Possible disturbing currents that are coupled into secondary winding 22 flow to ground and do not affect the activation of converters A, B. The same current therefore flows through both converters A, B. An asymmetrical activation, which could result in evaluation errors, is therefore prevented.

Switching device 12 includes two antiparallel-connected diodes 18a, 18b, each of which is connected with the second connector of converter A, B. In the transmission mode, diodes 18a, 18b are conductive due to the high signal amplitudes. They are reversed-biased in the receiving mode, however, since the received signal is typically smaller—by several magnitudes—than the transmitted signal and does not exceed the threshold voltage of the diodes. In this case, output path and measurement path, 17a, 17b respectively, of converters A, B are separated from each other and may therefore be evaluated independently.

A separate operational amplifier 14a, 14b is assigned to each converter A, B. In the exemplary embodiment shown, amplifiers 13a, 13b are realized as negative-feedback amplifiers, each of which includes a non-linear element 15a, 15b in the feedback path. Amplifiers 13a, 13b therefore fulfill the preconditions of a reciprocal circuit and have a high input impedance, which is specified only by $C_1$ and $R_3$ or $C_2$ and $R_4$, and is therefore independent of the amplitude of the input signal.

Non-linear element 15a or 15b may include, e.g., two antiparallel-connected diodes 26a-26d, which are switched between the output and the inverting input of particular amplifier 14a, 14b. A resistor $R_5$ or $R_6$ is connected in parallel with diodes 26a-26d.

In the receiving mode, i.e., with both switches 20a, 20b open, ultrasonic converters A, B are connected to ground in a relatively low-resistance manner via part windings 22a, 22b. When the inputs of amplifiers 13a, 13b are designed with very high resistance, this is sufficient to not impair the converters using the amplifiers, as is described below.

The inputs (−) of amplifiers 14a, 14b are each connected with a high impedance $C_1$, $R_3$ or $C_2$, $R_4$. This impedance is preferably higher than damping resistance $R_1$ and $R_2$ of converters A, B by several orders of magnitude. The following therefore applies: $R_3 \gg R_1$ and $R_4 \gg R_2$. In this manner, the influence of amplifiers 14a, 14b on the signal to be evaluated is minimized. In addition, the impedance of secondary windings 22a, 22b, via which the circuit is closed in the receiving mode, becomes very small relative to the amplifier input impedance.

The input impedance is also realized using purely passive components C and R.

Amplifiers 14a, 14b are supplied with electrical energy from two voltage sources 16a, 16b. The two non-inverting inputs (+) are connected to the same supply potential.

Outputs $out_1$ and $out_2$ of amplifiers 14a, 14b can be digitized and evaluated, e.g., using an ADC.

Transformer 11 preferably has a core with an air gap. As a result, narrower tolerances in terms of manufacture, temperature dependence, and aging resistance of the core may be obtained compared with, e.g., ferrite cores without an air gap. The amount of transferable power also increases.

Figure 4:
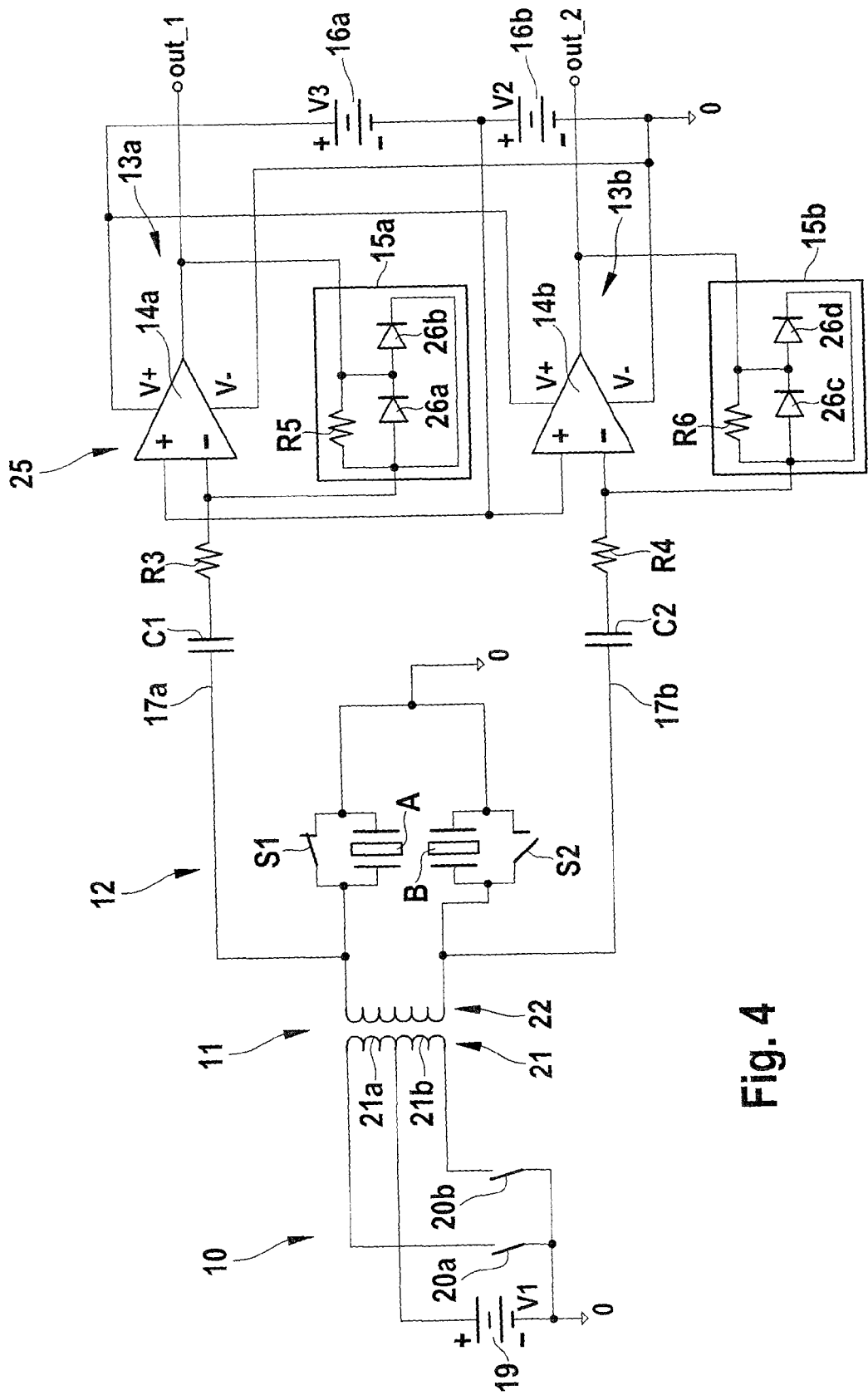
FIG. 4 shows a transmitting and receiving circuit according to a second embodiment of the present invention.

FIG. 4 shows the transmitting and receiving circuit in FIG. 3, but with a different switching device 12, according to a second embodiment of the present invention. With this embodiment, each ultrasonic converter A, B includes a parallel-connected switch S1, S2, which form switching device 12. An additional diode arrangement is not provided.

Converters A, B are connected with secondary winding 22 of transformer 11 on the transmission side, and, on the reception side, they are connected with each other directly, i.e., without any further switching elements. In this case, it is not necessary to tap secondary winding 22 in the center.

In the transmission mode, a switch (S1 in this case) is closed; associated converter A is therefore short-circuited. The other switch, S2, is open, thereby enabling associated converter B to operate in the transmission mode. The switching position of switches S1, S2 is reversed in the receiving mode. Previously-transmitting converter B is then short-circuited, and the other converter, A, receives an ultrasonic signal sent by converter B. In this switch setting, it is also possible to transmit in the other direction, i.e., from converter A. This signal may be received by converter B by reversing the switch position once more.

FIG. 5 shows a control circuit for controlling transistors 20a, 20b. The control circuit is composed essentially of logic gates. Only one clock pulse US is required in this case to trigger both switches 20a, 20b. Clock pulse US is applied at the inputs (gates) of transistors 20a, 20b in the inverted or non-inverted form. As a result, switches 20a, 20b are switched on and off opposite to one another. The particular switching procedure is designed such that conducting transistor 20a or 20b is always switched off first, then the non-conducting switch is switched on. This functionality may also be implemented, e.g., as software in an electronic control unit.

In the upper branch, clock pulse US is first sent to a NAND gate 33, followed by a further NAND gate 34a. Second NAND gate 34a is connected at an input with a time-delay element 31a, which results in a time delay of the leading edge. In another branch, clock pulse US is sent to a NAND gate 34b, which is also connected at an input with a time-delay element 31b. As a result, the leading edge of the other transistor (20b) is delayed relative to the falling edge of the first transistor (20a). Time-delay elements 31a, 31b each include a resistor $R_5$ or $R_6$ and a capacitor $C_3$ or $C_4$ that is connected, e.g., to ground. The outputs of NAND gates 34a, 34b are applied to the input of an OR gate 35a or 35b. The transmission signal may be released selectively as either high-active or low-active via gates 32, 37 and 38 in combination with signals En_low and En_high. Finally, the outputs of OR gates 35a, 35b are connected via an inverting driver 36a, 36b with the control connections (gates) of transistors 20a, 20b.

Figure 6:
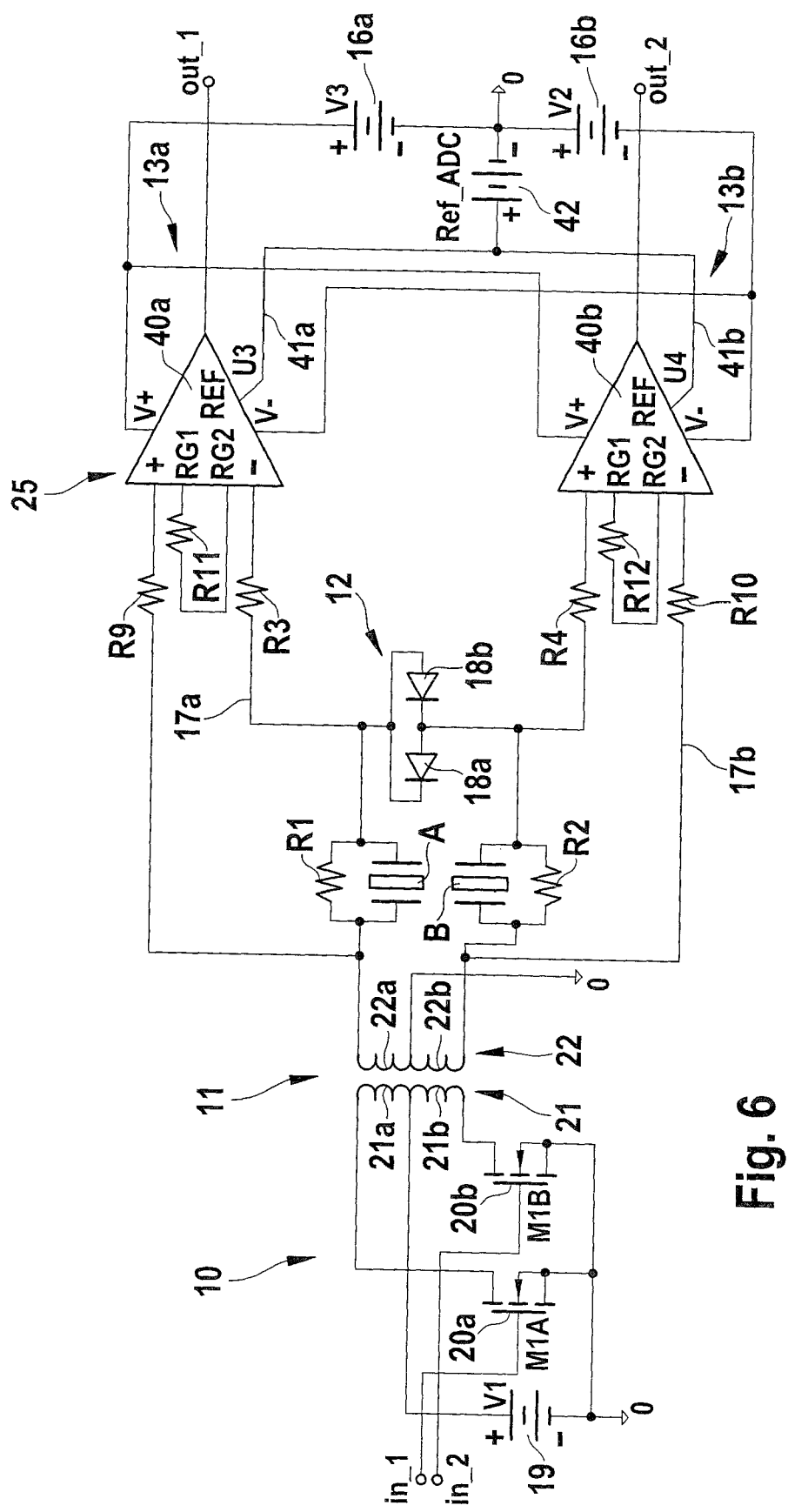
FIG. 6 shows a transmitting and receiving circuit according to a second embodiment of the receiving circuit, with instrument amplifiers.

FIG. 6 shows a second embodiment of a transmitting and receiving circuit, with which receiving circuit 25 includes two instrument amplifiers 40a, 40b. The signal voltages of converters A, B are evaluated in a differential manner in this case, and they are applied at the input (+,−) of amplifiers 40a, 40b. In order to not exceed the permissible maximum current of, e.g., ±60 mA, at the inputs, protective resistors $R_9$ or $R_{10}$ are connected at the inputs. For reasons of symmetry, the two other amplifier inputs are also provided with series resistors $R_3$, $R_4$ of the same size. The amplification is adjusted using resistors $R_{11}$ and $R_{12}$.

In the receiving mode, all incoming input signals are located near the ground potential. The amplifier inputs, which are very high-resistance in this case, do not produce a significant current flow, so that, in essence, only the desired open circuit voltage of the ultrasonic converters is measured.

Figure 7:
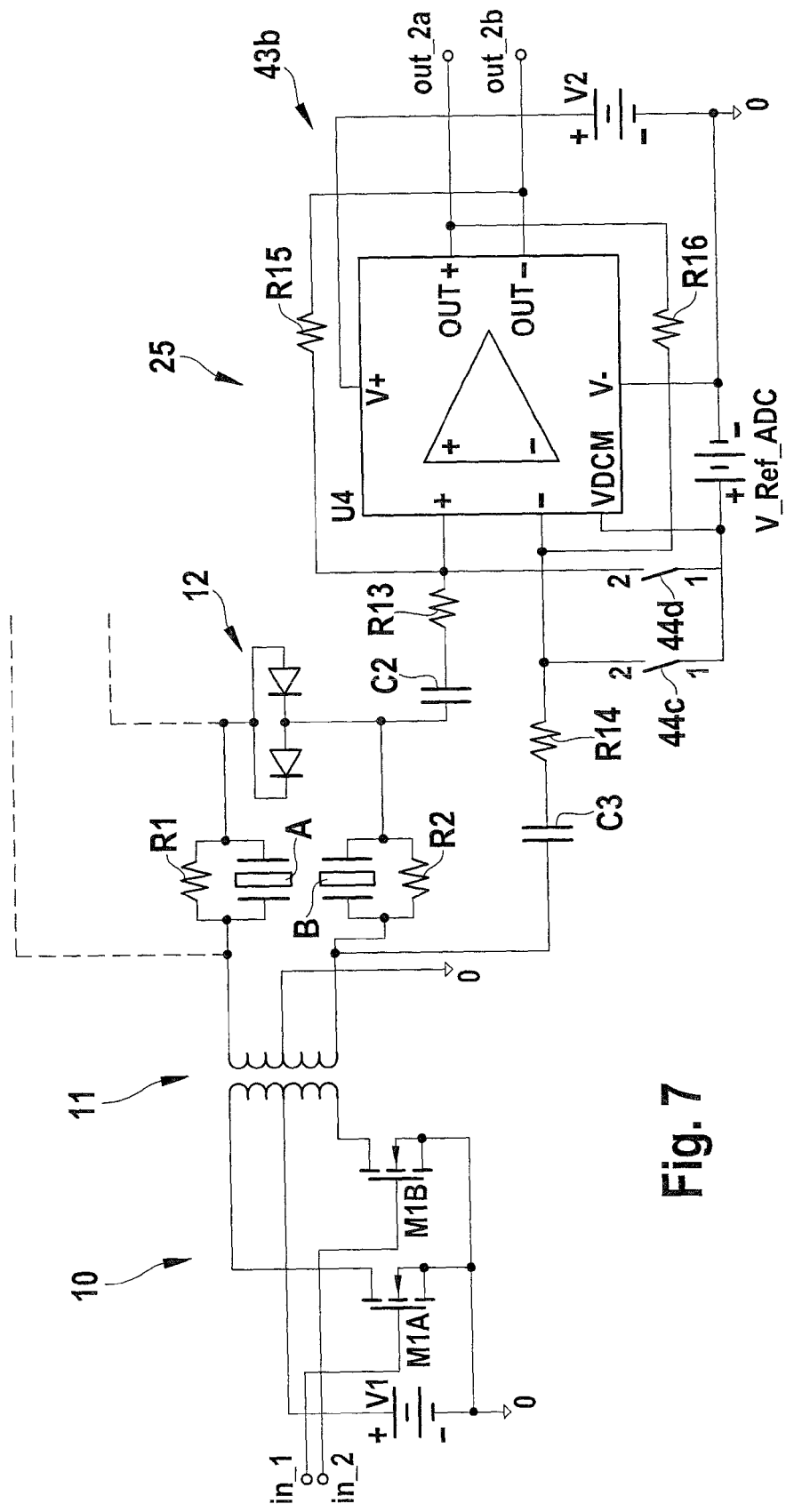
FIG. 7 shows a transmitting and receiving circuit according to a third embodiment of the receiving circuit, with fully differential amplifiers (only one of which is shown).

FIG. 7 shows a third embodiment of a transmitting and receiving circuit, with which receiving circuit 25 is realized using fully differential amplifiers 43a, 43b. (For simplicity, only amplifier 43b is shown here.)

In contrast to instrument amplifiers, fully differential amplifiers 43a, 43b have a symmetrical output. As a result, it is possible to hold the inputs at a constant potential using negative feedback. A resistor $R_{15}$ or $R_{16}$ is located in the individual feedback paths. A switch 44a-44d is connected to each of its inputs (+,−), with which the input may be connected with a reference potential. In the transmission mode, the inputs are fixedly connected with this reference potential using switches 44a-44d. Amplifier 43a or 43b therefore need not follow the steep signal flanks, nor is it loaded with a high input current. Switches 44a-44d are open in the receiving mode, however.

The two inputs (+,−), in turn, are connected with high input impedances $C_2$, $R_{13}$ or $C_3$, $R_{14}$, to minimize the influence on the measurement.

It will be understood that each of the elements described above, or two or more together, may also find a useful application in other types of constructions differing from the type described above.

While the invention has been illustrated and described as embodied in an ultrasonic sensor with reciprocal transmitting and receiving circuit, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. An ultrasonic sensor, comprising at least two ultrasonic converters each having a first and second connector, for transmitting and receiving ultrasonic signals; a transmitting circuit; a receiving circuit; and a switching device configured for switching said ultrasonic converters between a transmission mode and a receiving mode, wherein the ultrasonic converters are, with their first connector connected both with a secondary winding of a transformer of the transmitting circuit and with the receiving circuit, and with their second connector with a common reference potential and wherein the switching device comprises a first switch, which is connected in parallel with a first one of the ultrasonic converters, and a second switch, which is connected in parallel with a second one of the ultrasonic converters.

2. An ultrasonic sensor as defined in claim 1, wherein said transformer includes a core with an air gap.

3. An ultrasonic sensor as defined in claim 1, wherein said transmitting circuit includes an RC element that brings about a time delay of a control signal.

4. An ultrasonic sensor as defined in claim 1; and further comprising an amplifier assigned to each of said ultrasonic converters.

5. An ultrasonic sensor as defined in claim 4, wherein said amplifiers are configured as negative-feedback operational amplifiers.

6. An ultrasonic sensor as defined in claim 5, wherein said operational amplifiers each include a non-linear element in a feedback path.

7. An ultrasonic sensor as defined in claim 6, wherein said non-linear elements each include two antiparallel-connected diodes.

8. An ultrasonic sensor as defined in claim 1; and further comprising an instrument amplifier assigned to each of said ultrasonic converters.

9. An ultrasonic sensor as defined in claim 1; and further comprising a fully differential amplifier assigned to each of said ultrasonic converters.

10. An ultrasonic sensor as defined in claim 9, wherein each of said fully differential amplifiers includes at least two switches with which inputs (+, −) of a particular one of said amplifiers is connectable to a reference potential when in the transmission mode.

11. An ultrasonic sensor as defined in claim 10, wherein said fully differential amplifiers and said switches are integrated in an IC.

12. An ultrasonic sensor, comprising at least two ultrasonic converters each having a first and second connector, for transmitting and receiving ultrasonic signals; a transmitting circuit; a receiving circuit; and a switching device configured for switching said ultrasonic converters between a transmission mode and a receiving mode, wherein the ultrasonic converters are, with their first connector connected both with a secondary winding of a transformer of the transmitting circuit and with the receiving circuit, and wherein the switching device comprises a first switch, which is connected in parallel with a first one of the ultrasonic converters, and a second switch, which is connected in parallel with a second one of the ultrasonic converters, wherein said transformer has a primary winding which includes at least two part windings; and further comprising a switch connected to each of said two part windings.

13. An ultrasonic sensor as defined in claim 12; and further comprising a voltage source connected to a central node of said primary winding.

14. An ultrasonic sensor, comprising at least two ultrasonic converters each having a first and second connector, for transmitting and receiving ultrasonic signals; a transmitting circuit; a receiving circuit; and a switching device configured for switching said ultrasonic converters between a transmission mode and a receiving mode, wherein the ultrasonic converters are, with their first connector connected both with a secondary winding of a transformer of the transmitting circuit and with the receiving circuit, and wherein the switching device comprises a first switch, which is connected in parallel with a first one of the ultrasonic converters, and a second switch, which is connected in parallel with a second one of the ultrasonic converters, wherein said transmitting circuit includes two switches controlled by control electronics, which are configured such that said switches are switched on and off in an alternating manner.

15. An ultrasonic sensor as defined in claim 14, wherein said control electronics is configured such that one of said switches which is a conducting switch is switched off first and then the other of said switches which is a non-conducting switch is switched on.

\* \* \* \* \*